United States Patent Office.

HENRY SPENCER BLACKMORE, OF MOUNT VERNON, NEW YORK.

METHOD OF MAKING GAS-PURIFYING AGENTS.

SPECIFICATION forming part of Letters Patent No. 697,931, dated April 15, 1902.

Application filed February 16, 1901. Serial No. 47,676. (No specimens.)

*To all whom it may concern:*

Be it known that I, HENRY SPENCER BLACKMORE, a citizen of the United States, residing at 206 South Ninth avenue, Mount Vernon, in the county of Westchester and State of New York, have invented certain new and useful Improvements in Processes of Producing Gas-Purifying Agents; and I do hereby declare the following to be a full, clear, and exact description of the invention, such as will enable others skilled in the art to which it appertains to make and use the same.

The object of my invention is to produce a composition capable of purifying gas, such as illuminating-gas, by separating therefrom sulfurous or other deleterious contaminations; and it consists, essentially, in transforming dense ferruginous compounds, such as hematite, limonite, &c., into a hydrated condition and uniting the same with lime and water, thereby forming a composition capable of readily absorbing or combining with the sulfur contaminations in less time and at a reduced cost as compared with processes employed hitherto.

In carrying out my invention I take, for example, hematite, pulverize the same, and thoroughly mix it with pulverized quicklime. The mixture is then gradually moistened with water, when a reaction takes place, the heat generated by the slaking of the lime or greater affinity of the calcium oxid for water assisting in the hydration of the iron oxid in the hematite, while at the same time any silicious contamination of the ferruginous mineral will be removed by combination with the lime, and the iron oxid thus hydrated eventually combines readily with any excess of slaked lime, producing calcium ferrite, which when dry is pulverized and in a condition for use directly, the mass being of a more or less porous condition, thus allowing the sulfur contaminations of gas brought in contact with it to be readily absorbed.

The reaction which takes place in the treatment of hematite and limonite with calcium oxid and water may be illustrated by the following equation:

$$2Fe_2O_3 + CaO + 3H_2O = CaFe_2O_4 + Fe_2(OH)_6.$$

This shows the transforming and hydrating action of the calcium oxid and water on the contained iron oxid in the mineral. The heat liberated by the slaking of the lime causes the excess of the iron oxid to be disintegrated and become hydrated, thus:

$$Fe_2O_3 + 3H_2O = Fe_2(OH)_6.$$

It is seen, therefore, that the product really is a mixture of calcium ferrite and ferric hydroxid, (hydrate.)

It is well known that iron oxids, especially in a heated condition, can be and are employed as purifying agents for illuminating-gas, as is also metallic iron in the form of iron-turnings, and it is also well known that quicklime, such as shell-lime, can be readily employed for similar purposes; but all attempts to utilize the dense non-porous minerals, such as hematite and limonite, have proven failures, for the reason of its non-porous or vitreous condition; but I have found by my improved process of treatment I am able to transform the dense minerals hitherto incapable of being employed for the purpose of purifying gas into a valuable and efficient composition. I can also transform the more or less solid or vitreous iron cinder obtained as a residue in burning iron pyrites in the manufacture of sulfuric acid into a hydrated and porous composition capable of being employed for the separation of sulfurous compounds from gases by treating the pulverized cinder with quicklime and water after the same manner as described in the treatment of hematite.

I have found it of advantage in some cases to mix the ferruginous compound with quicklime and pulverize them together simultaneously, by which means I am enabled to obtain the product in a thoroughly-mixed condition.

The mixture of quicklime and a ferruginous compound should be treated with water as soon as possible after the mixture, and thus prevent decomposition of the lime by the action of carbon dioxid in the transformation, which retards the combination to a more or less degree.

I can also employ any mineral containing iron as principal constituent, such as iron sulfid, in place of the hematite aforementioned so long as the electronegative constituent of the mineral employed has a greater affinity for the lime, in which case by employing iron sulfid, such as pyrrhotite, the sulfid is transformed into iron oxid with the production of calcium sulfid, which may be washed out and the product treated with an excess of lime and water, as with the treatment of hematite before described.

By the following claims I intend to include all ferruginous compounds capable of being transformed from a dense or vitreous nature not capable of employment as gas-purifying agents into a porous or hydrated condition which can be so used by the action of an oxid capable of liberating heat in the presence of water and exposing the mixture to the action of water.

Some of the ores which may be employed may be noted as magnetite containing iron sulfid, phosphorus, titanium, or other contamination which may be present in such proportion as to preclude its application as a material from which iron or steel of commercial value can be produced, the action of calcium oxid and water on which transforms them into compounds capable of employment as gas-purifying agents. Any other mineral or compound containing iron as principal constituent of vitreous, non-porous, or insoluble nature may be employed without departing from the spirit of my invention.

The term "insoluble" as employed throughout this specification and claims relates to compounds which are practically insoluble in water.

It will be noted that the material employed for transformation by the combined action of calcium oxid and water has iron as principal constituent or iron oxid as principal ingredient, the material being also of refractory nature.

I am aware that certain minerals, such as cryolite containing iron compounds as a contamination in small percentage, have been exposed to the combined action of lime and water for the purpose of transforming the larger constituents thereof—i. e., fluorid of aluminium and sodium—into sodium aluminate and calcium fluorid; but in this case it was not the object to transform dense, vitreous, or refractory iron contamination into a porous hydrated condition, as performed by my process. It can also be readily seen that there was no action on the iron constituent until after all the larger and less stable compounds had been transformed, and then only when there was an excess of lime, making it of no value from a commercial standpoint for transforming the iron constituent into a gas-purifying agent.

Having now described my invention, what I claim as new, and desire to secure by Letters Patent, is—

1. The process of making a composition for use in purifying gas which consists in exposing dense or vitreous iron ore to the action of metallic oxid and water capable of liberating heat in the mixture by chemical reaction.

2. The process of making a composition for use in purifying gas which consists in exposing a water-insoluble compound, containing iron as principal constituent, to the action of calcium oxid and water.

3. The process of making a composition for use in purifying gas which consists in exposing a broken or comminuted composition, insoluble in water, containing iron oxid as principal ingredient, to the action of calcium oxid and water.

4. The process of making a composition for use in purifying gas which consists in pulverizing hematite, mixing the same with pulverized calcium oxid, and exposing it to the action of water.

5. The process of making a composition for use in purifying gas which consists in exposing a refractory ore containing iron to the combined action of calcium oxid and water.

6. The process of making a composition for use in purifying gas which consists in exposing a refractory compound containing iron as principal constituent, to the action of calcium oxid and water.

In testimony whereof I affix my signature in presence of two witnesses.

HENRY SPENCER BLACKMORE.

Witnesses:
WARREN C. STONE,
H. N. JENKINS.